United States Patent
Lee

(10) Patent No.: US 9,635,645 B2
(45) Date of Patent: Apr. 25, 2017

(54) METHOD OF HANDLING RESOURCE ALLOCATION IN TDD SYSTEM AND RELATED COMMUNICATION DEVICE

(71) Applicant: Industrial Technology Research Institute, Hsinchu (TW)

(72) Inventor: Chien-Min Lee, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 279 days.

(21) Appl. No.: 13/869,980

(22) Filed: Apr. 25, 2013

(65) Prior Publication Data

US 2013/0294297 A1    Nov. 7, 2013

Related U.S. Application Data

(60) Provisional application No. 61/641,310, filed on May 2, 2012.

(51) Int. Cl.
*H04W 72/04* (2009.01)
*H04W 72/12* (2009.01)
*H04L 1/18* (2006.01)

(52) U.S. Cl.
CPC ........... *H04W 72/04* (2013.01); *H04L 1/1854* (2013.01); *H04W 72/1257* (2013.01)

(58) Field of Classification Search
None
See application file for complete search history.

(56) References Cited

U.S. PATENT DOCUMENTS

| | | | |
|---|---|---|---|
| 2010/0080166 A1 | 4/2010 | Palanki | |
| 2011/0176461 A1 | 7/2011 | Astely | |
| 2012/0230273 A1* | 9/2012 | He et al. | 370/329 |
| 2013/0044651 A1* | 2/2013 | Wang et al. | 370/280 |
| 2013/0083736 A1* | 4/2013 | Yin et al. | 370/329 |
| 2013/0188516 A1* | 7/2013 | He et al. | 370/254 |
| 2013/0194980 A1* | 8/2013 | Yin et al. | 370/280 |
| 2013/0272170 A1* | 10/2013 | Chatterjee et al. | 370/280 |

FOREIGN PATENT DOCUMENTS

CN    102026209 A    4/2011

OTHER PUBLICATIONS

Catt, 2GPP TSG RAN WG1 Meeting #67, R1-113724, Design of TDD Inter-band Carrier Aggregation, Nov. 2011, pp. 1-6.*
LG Electronics, Issues in Further Enhancements to LTE TDD, 3GPP TSG RAN WG1 Meeting #68bis, R1-121461, Mar. 26-30, 2012, pp. 1-4, XP050599742, Jeju, Korea.

(Continued)

*Primary Examiner* — Donald Mills
(74) *Attorney, Agent, or Firm* — Winston Hsu; Scott Margo

(57) ABSTRACT

A method of handling resource allocation for a network of a wireless communication system comprises transferring from a first uplink (UL)/downlink (DL) configuration to a second UL/DL configuration in a first frame; and performing a triggered transmission or reception with a communication device of the wireless communication system in a subframe of a second frame according to the first UL/DL configuration.

20 Claims, 17 Drawing Sheets

(56) References Cited

OTHER PUBLICATIONS

Alcatel-Lucent Shanghai Bell et al, Discussion on HARQ and UL-grant timing with dynamic TDD UL-DL configuration, 3GPP TSG RAN WG1 Meeting #68bis, R1-121260, Mar. 26-30, 2012, pp. 1-6, XP050599549, Jeju, Korea.
Samsung, CRS presence in flexible subframes, 3GPP TSG RAN WG1 #72bis, R1-131008, Apr. 15-19, 2013, XP050696714, Chicago, USA.
Huawei et al, Potential signaling enhancements for TDD eIMTA, 3GPP TSG RAN WG1 Meeting #72, R1-130445, Jan. 28-Feb. 1, 2013, XP050663728, St. Julian's, Malta.
Huawei et al, Backward compatibility for TDD eIMTA, 3GPP TSG RAN WG1 Meeting #72bis, R1-130884, Apr. 15-19, 2013, XP050696885, Chicago, USA.
Intel Corporation, Remaining issues of CA for different TDD UL-DL configurations, 3GPP TSG-RAN WG1 #68bis, R1-121531, Mar. 26-30, 2012, pp. 1-5, XP050599804, Jeju, Korea.

\* cited by examiner

| UL/DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

FIG. 1

METHOD OF HANDLING RESOURCE ALLOCATION IN TDD SYSTEM AND RELATED COMMUNICATION DEVICE

CROSS REFERENCE TO RELATED APPLICATIONS

This application claims the benefit of U.S. Provisional Application No. 61/641,310, filed on May 2, 2012 and entitled "Method for assigning radio resource in TDD system and apparatus using the same", the contents of which are incorporated herein in their entirety.

BACKGROUND OF THE INVENTION

1. Field of the Invention

The present invention relates to a method used in a wireless communication system and related communication device, and more particularly, to a method of handling resource allocation in a time-division duplexing (TDD) and related communication device.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of a universal mobile telecommunications system (UMTS), for further enhancing performance of the UMTS to satisfy increasing needs of users. The LTE system includes a new radio interface and a new radio network architecture that provides a high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint transmission/reception (CoMP), UL multiple-input multiple-output (MIMO), etc. For a UE and an eNB to communicate with each other in the LTE-A system, the UE and the eNB must support standards developed for the LTE-A system, such as the 3GPP Rel-10 standard or later versions.

Different from the LTE/LTE-A system with frequency-division duplexing (FDD), directions of subframes of a frequency band in the LTE/LTE-A system with time-division duplexing (TDD) may be different. That is, the subframes in the same frequency band are divided into uplink (UL) subframes, downlink (DL) subframes and special subframes according to the UL/DL configuration specified in the 3GPP standard.

Please refer to FIG. 1 which is a table 10 of the UL/DL configuration with subframes and corresponding directions. In FIG. 1, 7 UL/DL configurations are shown, wherein each of the UL/DL configurations indicates a set of directions for 10 subframes, respectively. In detail, "U" means that the subframe is a UL subframe where UL data is transmitted, and "D" means that the subframe is a DL subframe where DL data is transmitted. "S" means that the subframe is a special subframe where control information and maybe data (according to the special subframe configuration) is transmitted, and the special subframe can also be seen as the DL subframe in the present invention.

Furthermore, a UL/DL configuration of a legacy UE can be changed according to System Information Block Type 1 (SIB1) transmitted by an eNB, e.g., from the UL/DL configuration 1 to the UL/DL configuration 3. A minimum periodicity of transmitting the SIB1 is usually large (e.g., 640 ms), and the legacy UE can only change the UL/DL configuration with the periodicity greater than 640 ms. The semi-statics allocation cannot match fast varying traffic characteristics and environments, and there is space for improving system performance. Thus, changing the UL/DL configuration with a lower periodicity (e.g., lower than 640 ms) is considered.

In general, the legacy UE is configured with a UL/DL configuration according to the SIB1, and this UL/DL configuration is also known by an advanced UE which is configured with an additional UL/DL configuration. The additional configuration is a real configuration operated by the eNB, and the eNB provides services (i.e., performs transmissions and/or receptions) to both the legacy UE and the advanced UE according to the additional configuration.

However, when the advanced UE transfers from a first UL/DL configuration to a second UL/DL configuration (i.e., real configuration), it may happen that the advanced UE intends to perform a transmission in a DL subframe determined according to the second UL/DL configuration, or to perform a reception in a UL subframe according to the second UL/DL configuration. This causes a conflict, since the advanced UE should perform the transmission in the UL subframe and perform the reception in the DL subframe. Besides, the legacy UE may lose scheduling opportunity in a subframe, since the legacy UE does not know the real configuration and the eNB need to provide backward compatibility to the legacy UE. More specifically, the eNB may not schedule the legacy UE to perform a transmission or reception in the subframe, when directions of the subframe determined according to the UL/DL configuration of the legacy UE and the real configuration are different, i.e., when the conflict occurs. Thus, operations of the legacy UE and the network are affected, and resource may be wasted.

Thus, how to solve the conflict caused due to transfers of the UL/DL configuration or difference of the UL/DL configurations is an important topic to be discussed.

SUMMARY OF THE INVENTION

The present invention therefore provides a method and related communication device for handling resource allocation in a time-division duplexing (TDD) system to solve the abovementioned problem.

A method of handling resource allocation for a network of a wireless communication system comprises transferring from a first uplink (UL)/downlink (DL) configuration to a second UL/DL configuration in a first frame; and performing a triggered transmission or reception with a communication device of the wireless communication system in a subframe of a second frame according to the first UL/DL configuration.

A method of handling resource allocation for a communication device of a wireless communication system comprises receiving a notification transmitted by a network of the wireless communication system, for indicating the communication device to transfer from a first uplink (UL)/downlink (DL) configuration to a second UL/DL configuration in a first frame; and performing a triggered transmission or reception with the network in a subframe of a second frame according to the first UL/DL configuration.

A method of handling resource allocation for a communication device of a wireless communication system comprises receiving a notification transmitted by a network of the wireless communication system, for indicating the communication device to transfer from a first uplink (UL)/downlink (DL) configuration to a second UL/DL configuration in a first frame; and performing a triggered transmission or reception with the network in a subframe of a second frame according to the second UL/DL configuration.

A method of handling resource allocation for a communication device of a wireless communication system comprises receiving a notification transmitted by a network of the wireless communication system, for indicating the communication device to transfer from a first uplink (UL)/downlink (DL) configuration to a second UL/DL configuration in a first frame; configuring scheduling timing and hybrid automatic repeat request (HARQ) timing according to the second UL/DL configuration in a second frame; and adopting resource definition according to the second UL/DL configuration in a third frame later than the second frame, to transfer from the first UL/DL configuration to the second UL/DL configuration in the third frame.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 is a table 10 of the UL/DL configuration with subframes and corresponding directions.

DETAILED DESCRIPTION

Figure 2:
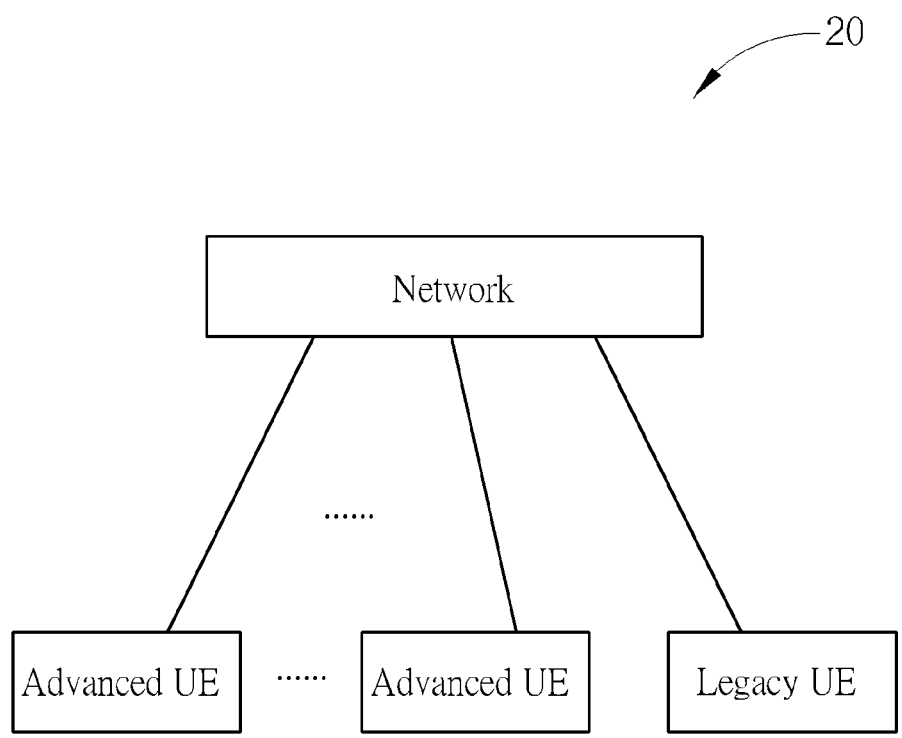
FIG. 2 is a schematic diagram of a wireless communication system according to an example of the present invention.

Please refer to FIG. 2, which is a schematic diagram of a wireless communication system 20 according to an example of the present invention. The wireless communication system 20 is briefly composed of a network, advanced user equipments (UEs) and a legacy UE. The wireless communication system 20 supports a time-division duplexing (TDD) mode. That is, the network and the UEs can communicate with each other by using uplink (UL) subframes and downlink (DL) subframes according to one or more UL/DL configurations. A minimum periodicity for changing an UL/DL configuration of the advanced UE is smaller than a minimum periodicity for changing a UL/DL configuration of the legacy UE. That is, the advanced UE can change its UL/DL configuration fast according to fast varying traffic characteristics and environments. Besides, the advanced UE know the UL/DL configuration of the legacy UE, e.g., according to System Information Block Type 1 (SIB1) transmitted by the network. In general, the advanced UE refers to a communication device supporting the 3rd Generation Partnership Project (3GPP) Rel-11 standard or later versions. However, this is not a restriction, and the legacy UE may also have functions similar to those supported by the advanced UE via an update, and is not limited herein.

In FIG. 2, the network and the UEs are simply utilized for illustrating the structure of the wireless communication system 20. Practically, the network can be a universal terrestrial radio access network (UTRAN) comprising a plurality of Node-Bs (NBs) in a universal mobile telecommunications system (UMTS). Alternatively, the network can be an evolved UTRAN (E-UTRAN) comprising a plurality of evolved NBs (eNBs) and/or relays in a long term evolution (LTE) system, a LTE-Advanced (LTE-A) system or an evolution of the LTE-A system.

Furthermore, the network can also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a UE (advanced UE or legacy UE), the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. Besides, the information can be processed by both the UTRAN/E-UTRAN and the core network, and the decisions are made after coordination and/or cooperation are performed by the UTRAN/E-UTRAN and the core network. A UE can be a mobile phone, a laptop, a tablet computer, an electronic book or a portable computer system. Besides, the network and the UE can be seen as a transmitter or a receiver according to direction, e.g., for an uplink (UL), the UE is the transmitter and the network is the receiver, and for a downlink (DL), the network is the transmitter and the UE is the receiver. More specifically, for the network, the direction of the transmission is DL, and the direction of the reception is UL. For the UE, the direction of the transmission is UL, and the direction of the reception is DL.

Figure 3:
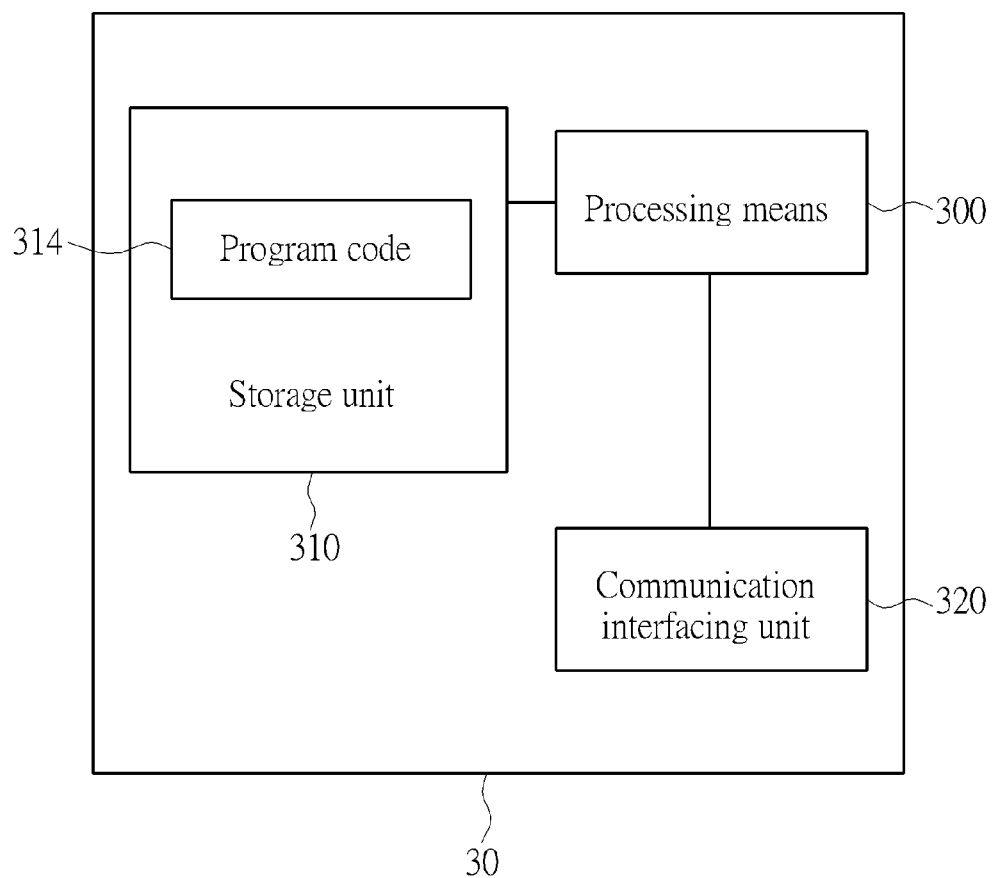
FIG. 3 is a schematic diagram of a communication device according to an example of the present invention.

Please refer to FIG. 3, which is a schematic diagram of a communication device 30 according to an example of the present invention. The communication device 30 can be an advanced UE, the legacy UE or the network shown in FIG. 2, but is not limited herein. The communication device 30 may include a processing means 300 such as a microprocessor or Application Specific Integrated Circuit (ASIC), a storage unit 310 and a communication interfacing unit 320. The storage unit 310 may be any data storage device that can store a program code 314, accessed and executed by the processing means 300. Examples of the storage unit 310 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 320 is preferably a transceiver and is used to transmit and receive signals (e.g., messages or packets) according to processing results of the processing means 300.

Figure 4:
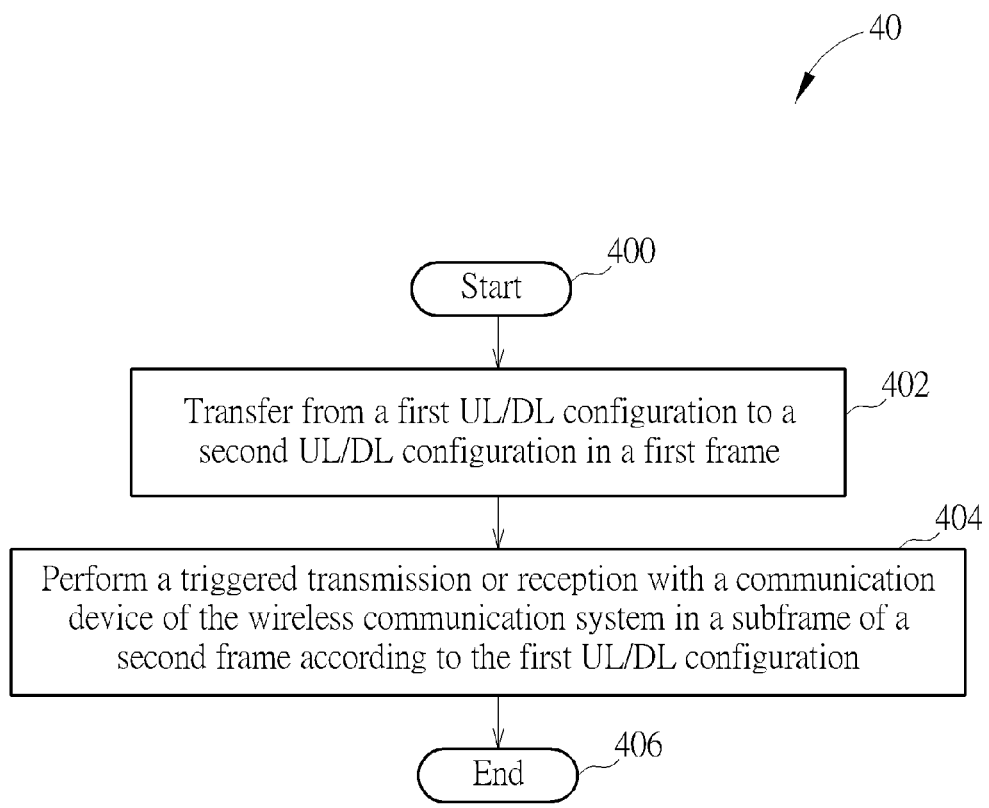
FIG. 4 is a flowchart of a process according to an example of the present invention.

Please refer to FIG. 4, which is a flowchart of a process 40 according to an example of the present invention. The process 40 is utilized in the network shown in FIG. 2, for handling resource allocation in the TDD mode. The process 40 may be compiled into the program code 314 and includes the following steps:

Step 400: Start.

Step 402: Transfer from a first UL/DL configuration to a second UL/DL configuration in a first frame.

Step 404: Perform a triggered transmission or reception with a communication device of the wireless communication system in a subframe of a second frame according to the first UL/DL configuration.

Step 406: End.

According to the process 40, after the network transfers from a first UL/DL configuration to a second UL/DL configuration in a first frame, the network still performs a triggered transmission or reception (if any) with a communication device (e.g., the advanced UE or the legacy UE shown in FIG. 1) of the wireless communication system in a subframe of a second frame according to the first UL/DL configuration. That is, even if the network has transferred to the second UL/DL configuration in the first frame, the network still performs the triggered transmission or reception in the subframe of the second frame according to the first UL/DL configuration. The triggered transmission or reception may include a hybrid automatic repeat request (HARQ) feedback and/or a UL grant triggered by at least one previous transmission or reception performed in at least one previous subframe of at least one previous frame according to the first UL/DL configuration. Thus, the communication device will not lose the triggered transmission or reception during the transfer of the UL/DL configuration, and can still operate regularly.

Please note that, realization of the process 40 is not limited. For example, the first frame and the second frame can be the same frame or different frames. Besides, the network can perform one or more new transmissions or receptions according to the second UL/DL configuration (i.e., real configuration) in the subframe where the triggered transmission or reception is performed, if no conflict occurs. Further, the network may also perform one or more new transmissions or receptions according to the second UL/DL configuration (i.e., real configuration) in the subframes where no triggered transmission or reception is to be performed. On the other hand, the network may perform the triggered transmission or reception with the communication device in the subframe of the second frame according the first UL/DL configuration, when a direction of the subframe determined according to the first UL/DL configuration and a direction of the subframe determined according to the second UL/DL configuration are different. In another example, the network may perform the triggered transmission or reception with the communication device in the subframe of the second frame according the first UL/DL configuration, when a direction of the subframe determined according to the first UL/DL configuration is UL.

Figure 5:
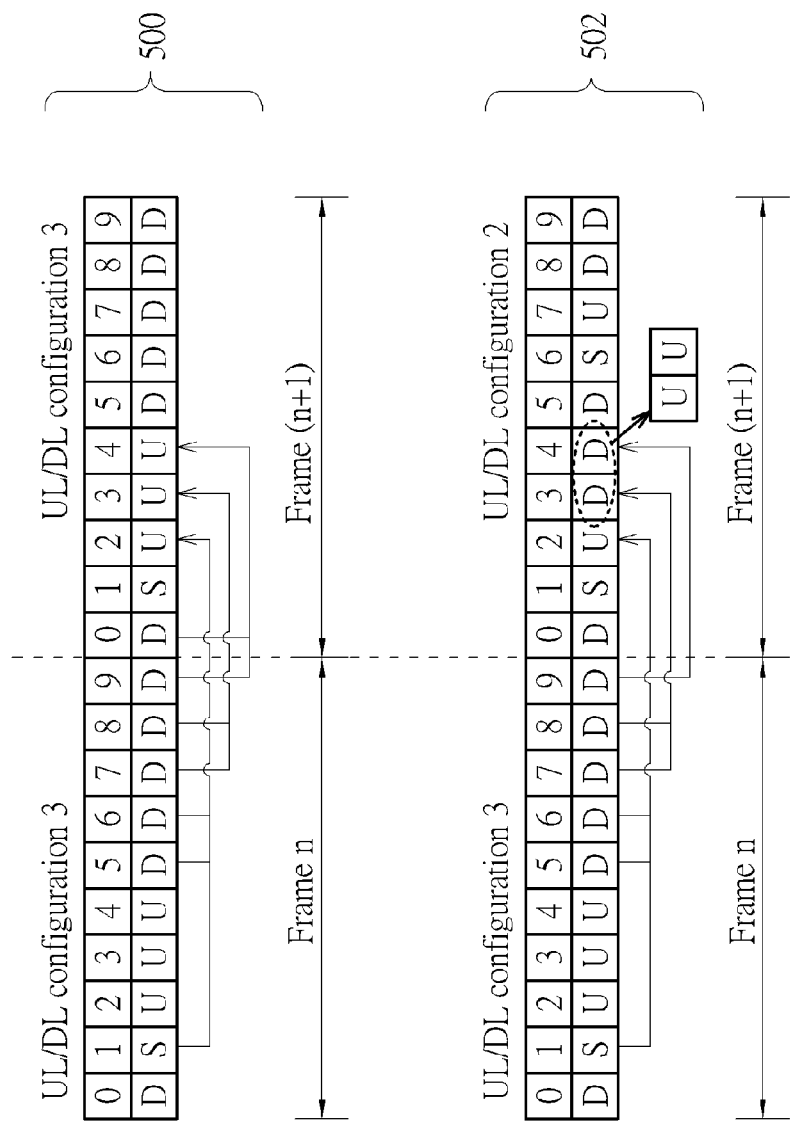
FIGS. 5-6 are schematic diagrams of subframe allocation with transfer of the UL/DL configuration according to an example of the invention.

Please refer to FIG. 5, which is a schematic diagram of subframe allocation with transfer of the UL/DL configuration according to an example of the invention. In detail, "U" means that the subframe is a UL subframe where UL transmission/reception is performed, and "D" means that the subframe is a DL subframe where DL transmission/reception is performed. "S" means that the subframe is a special subframe where control information is transmitted, and the special subframe can also be seen as the DL subframe. Rules for performing triggered receptions (receiving e.g., HARQ feedbacks and/or UL grants) in the subframes of the frame (n+1) are represented by corresponding lines as shown in region 500 of FIG. 5. The network transfers from the UL/DL configuration 3 to the UL/DL configuration 2 in the frame (n+1) as shown in region 502 of FIG. 5. It may happen that the network has performed one or more transmissions in one or more of the DL subframes 1 and 5-9 of the frame n according to the UL/DL configuration 3. If the network intends to perform a triggered reception corresponding to (e.g., triggered by) the transmissions performed in the subframes 1, 5 and/or 6 of the frame n according to the UL/DL configuration 3, no conflict occurs since the subframe 2 of the frame (n+1) is the UL subframe. Accordingly, the network can perform the triggered reception regularly in the subframe 2 of the frame (n+1). However, the network cannot perform a triggered reception corresponding to the transmissions performed in the subframes 7 and/or 8 of the frame n according to the UL/DL configuration 3, since the subframe 3 of the frame (n+1) is the DL frame determined according to the UL/DL configuration 2. In this situation, the network can treat the subframe 3 of the frame (n+1) as the UL subframe according to the present invention, and performs the triggered reception in the subframe 3 of the frame (n+1). That is, the network will configure the subframe 3 of the frame (n+1) as the UL subframe, such that the network can perform the triggered reception. Similarly, the network can perform a triggered reception corresponding to a transmission performed in the subframe 9 of the frame n according to the UL/DL configuration 3, since the network treats the subframe 4 of the frame (n+1) as the UL subframe according to the present invention. Thus, the conflict occurred due to the transfer of the UL/DL configuration is solved, and the network and the UEs can operate regularly.

Figure 6:
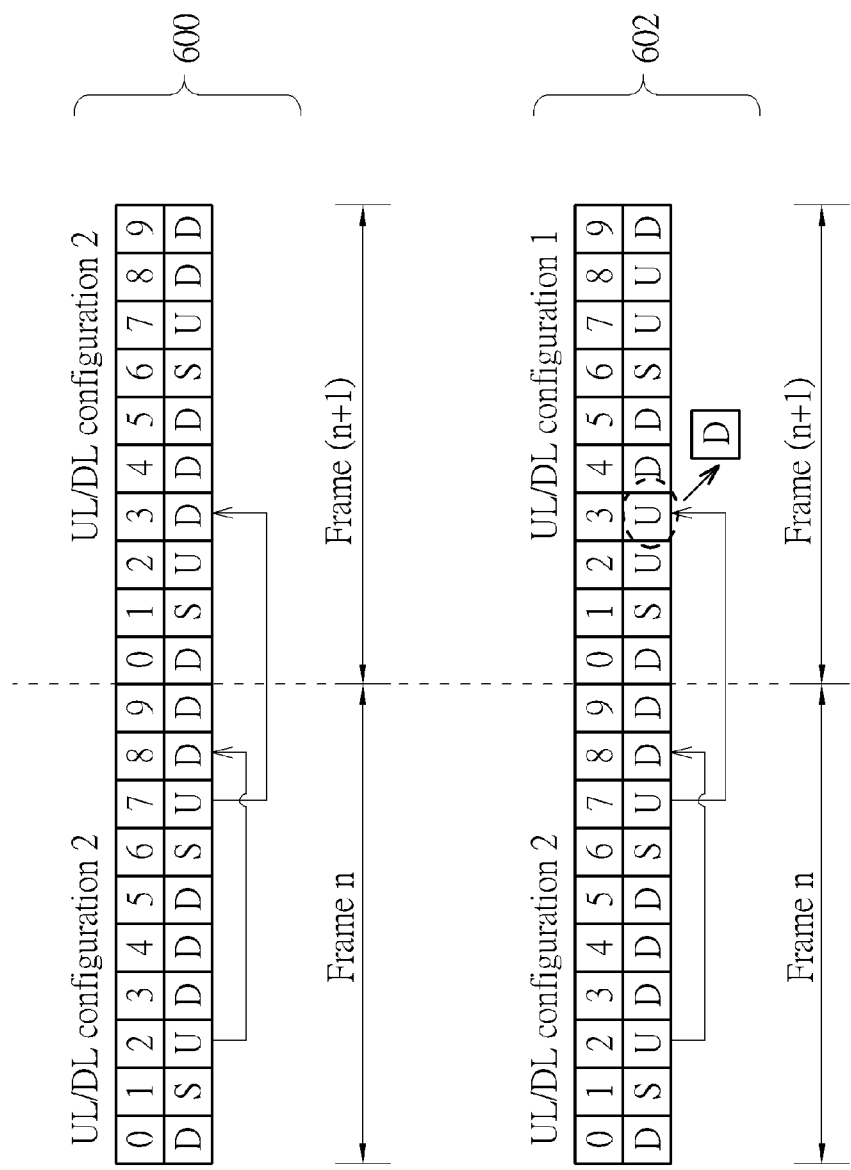

Please refer to FIG. 6, which is a schematic diagram of subframe allocation with transfer of the UL/DL configuration according to an example of the invention. Rules for performing triggered transmissions (e.g., transmitting HARQ feedbacks) in the subframes of the frame (n+1) are represented by corresponding lines as shown in region 600 of FIG. 6. Practically, the network transfers from the UL/DL configuration 2 to the UL/DL configuration 1 in the frame (n+1) as shown in region 602 of FIG. 6. It may happen that the network has performed one or more receptions in the UL subframes 2 and/or 7 of the frame n according to the UL/DL configuration 2. If the network intends to perform a triggered transmission corresponding to (e.g., triggered by) the reception performed in the subframe 2 of the frame n according to the UL/DL configuration 2, no conflict occurs since the subframe 8 of the frame n is the DL subframe. Accordingly, the network can perform the triggered transmission correctly in the subframe 8 of the frame n. However, the network cannot perform a triggered transmission corresponding to a reception performed in the subframe 7 of the frame n according to the UL/DL configuration 2, since the subframe 3 of the frame (n+1) is the UL frame determined according to the UL/DL configuration 1. In this situation, the network treats the subframe 3 of the frame (n+1) as the DL subframe according to the present invention, and performs the triggered transmission in the subframe 3 of the frame (n+1). That is, the network will configure the subframe 3 of the frame (n+1) as the DL subframe, such that the network can perform the triggered transmission. Thus, the conflict occurred due to the transfer of the UL/DL configuration is solved, and the network and the UEs can operate regularly.

Please note that, the triggered transmission for the network may include a physical DL shared channel (PDSCH) and/or a physical HARQ indicator channel (PHICH), and the triggered reception for the network may include a physical UL shared channel (PUSCH) and/or a physical UL control channel (PUCCH), and is not limited. Besides, when the network changes the direction of the subframe according to the above examples, the change of the direction can be seen as non-transparent since the communication device knows the change. However, this is not a limitation, and it may not be necessary to indicate the change to the communication device when the network changes the direction. That is, the change of the direction can be transparent to the communication device. For example, when the DL subframe is configured as the UL subframe, the communication device simply receives nothing and the network may not need to indicate the change to the communication device.

Figure 7:
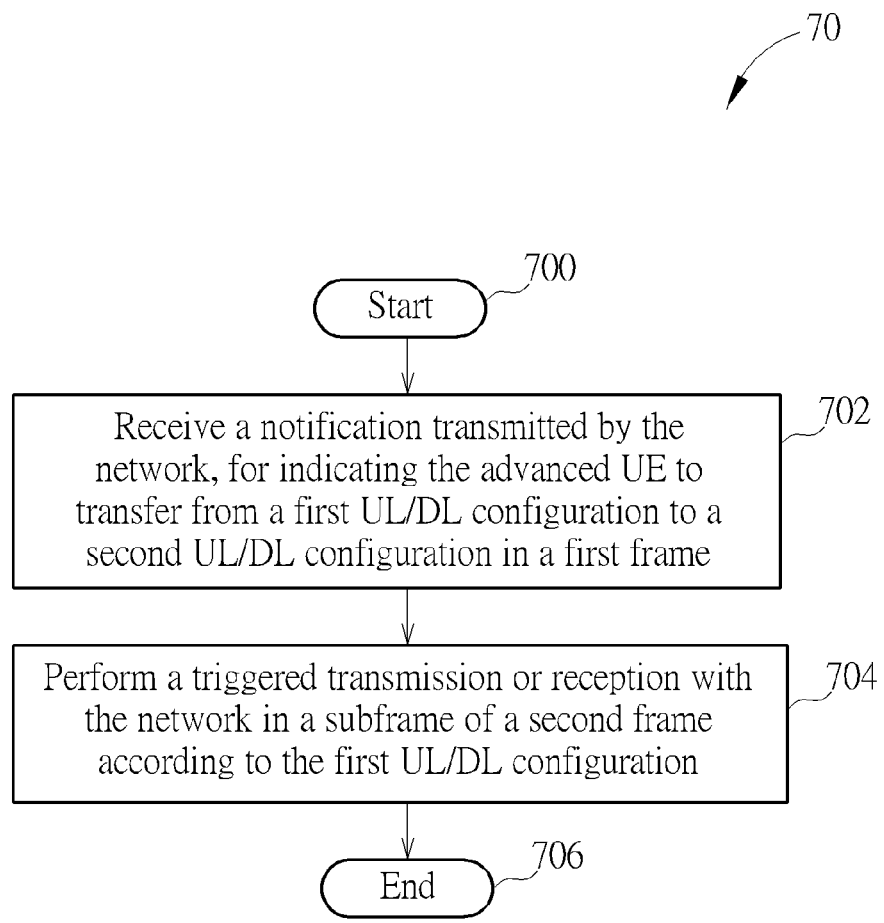
FIG. 7 is a flowchart of a process according to an example of the present invention.

Please refer to FIG. 7, which is a flowchart of a process 70 according to an example of the present invention. The process 70 is utilized in the advanced UE shown in FIG. 2, for handling resource allocation in the TDD mode. Preferably, the process 70 can be seen as a process corresponding to the process 40, for the advanced UE to communicate with the network in which the process 40 is utilized. The process 70 may be compiled into the program code 314 and includes the following steps:

Step 700: Start.

Step 702: Receive a notification transmitted by the network, for indicating the advanced UE to transfer from a first UL/DL configuration to a second UL/DL configuration in a first frame.

Step 704: Perform a triggered transmission or reception with the network in a subframe of a second frame according to the first UL/DL configuration.

Step 706: End.

According to the process 70, after the advanced UE receives a notification transmitted by the network, for indicating the advanced UE to transfer from a first UL/DL configuration to a second UL/DL configuration in a first frame, the advanced UE performs a triggered transmission or reception (if any) with the network in a subframe of a second frame according to the first UL/DL configuration. That is, even if the advanced UE has receives the notification, for transferring the UL/DL configuration in the first frame, the advanced UE may or may not transfer the UL/DL configuration immediately and still performs the triggered transmission or reception in the subframe of the second frame according to the first UL/DL configuration. The triggered transmission or reception may include a HARQ feedback and/or a UL grant triggered by at least one previous transmission or reception performed in at least one previous subframe of at least one previous frame according to the first UL/DL configuration. Thus, the advanced UE will not lose the triggered transmission or reception during the transfer of the UL/DL configuration, and can still operate regularly.

Please note that, realization of the process 70 is not limited. For example, the first frame and the second frame can be the same frame or different frames. That is, the advanced UE may transfer from the first UL/DL configuration to the second UL/DL configuration in the first frame, i.e., perform the transfer according to the notification. Besides, the advanced UE can perform one or more new transmissions or receptions according to the second UL/DL configuration (i.e., real configuration) in the subframe where the triggered transmission or reception is performed, if no conflict occurs. Further, the advanced UE may also perform one or more new transmissions or receptions according to the second UL/DL configuration (i.e., real configuration) in the subframes where no triggered transmission or reception is to be performed. In another example, the advanced UE may configure scheduling timing and HARQ timing according to the second UL/DL configuration in the second frame first. Then, the advanced UE adopts resource definition (i.e., subframe pattern as shown in FIG. 1) according to the second UL/DL configuration in a third frame later than the second frame, to transfer from the first UL/DL configuration to the second UL/DL configuration in the third frame. That is, the advanced UE performs the first part of the transfer of the UL/DL configuration in the second frame, and completes the rest part of the transfer of the UL/DL configuration in the third frame. In short, the advanced UE defers the transfer of the UL/DL configuration. Further, the advanced UE may defer the transfer of the UL/DL configuration, when a direction of the subframe determined according to the first UL/DL configuration and a direction of the subframe determined according to the second UL/DL configuration are different. That is, the advanced UE defers the transfer of the UL/DL configuration, when the conflict occurs.

In another example, when performing step 704, the advanced UE can perform the triggered transmission or reception with the network in the subframe of the second frame according to the first UL/DL configuration, when a direction of the subframe determined according to the first UL/DL configuration and a direction of the subframe determined according to the second UL/DL configuration are the same. Besides, the advanced UE drops the triggered transmission or reception, when the direction of the subframe determined according to the first UL/DL configuration and the direction of the subframe determined according to the second UL/DL configuration are different. That is, the advanced UE performs the triggered transmission or reception when no conflict occurs, and drops the triggered transmission or reception when the conflict occurs. In this situation, the network may treat the transmission dropped by the advanced UE as an ACK, if the transmission is a HARQ feedback.

Figure 8:
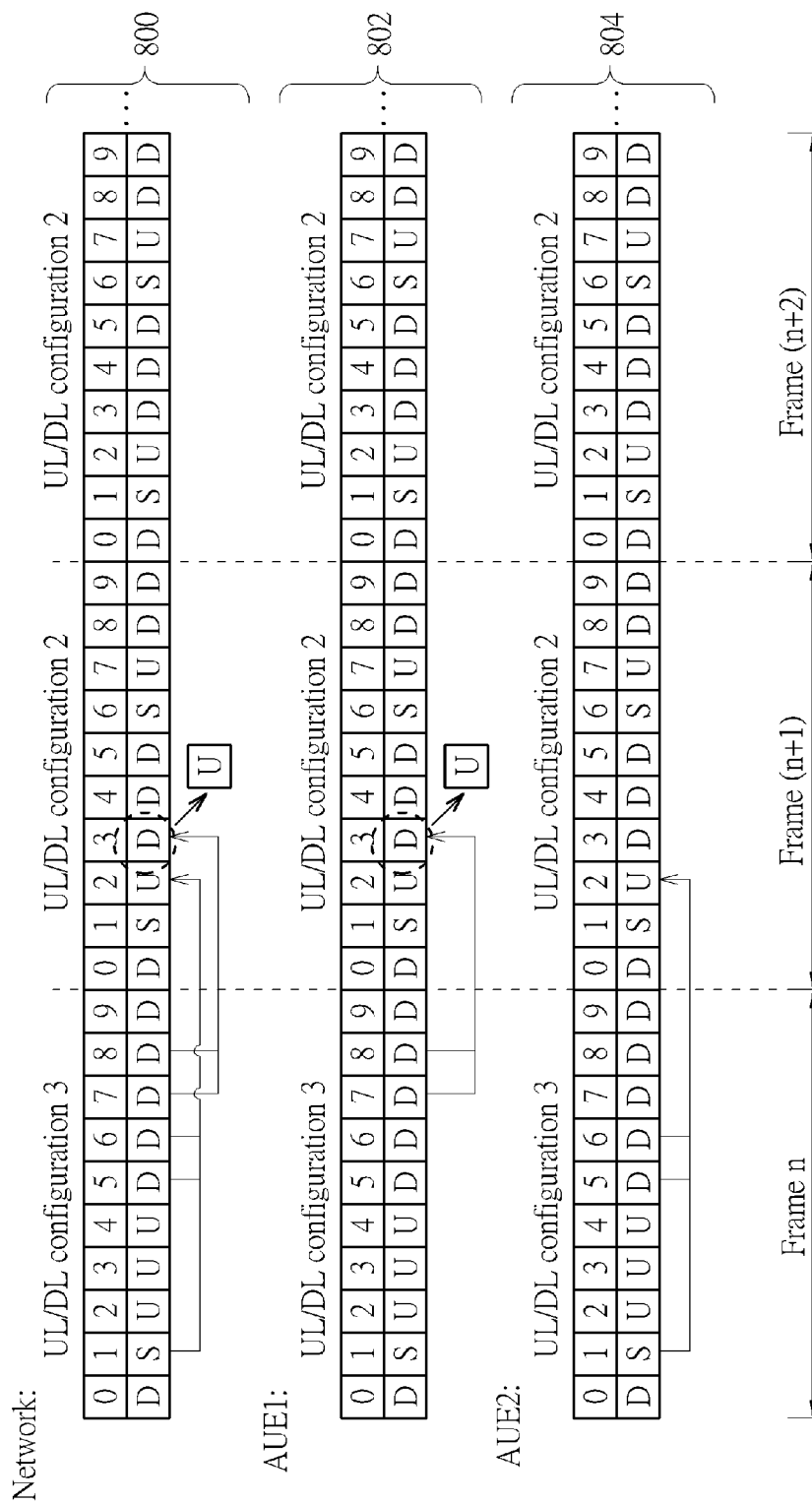
FIGS. 8-12 are schematic diagrams of subframe allocation with transfer of the UL/DL configuration according to an example of the invention.

Please refer to FIG. 8, which is a schematic diagram of subframe allocation with transfer of the UL/DL configuration according to an example of the invention, wherein the advanced UE AUE1, the advanced AUE2 and the network are considered. In detail, "U" means that the subframe is a UL subframe where UL transmission/reception is performed, and "D" means that the subframe is a DL subframe where DL transmission/reception is performed. "S" means that the subframe is a special subframe where control information is transmitted, and the special subframe can also be seen as the DL subframe. Rules for performing triggered transmissions (e.g., transmitting HARQ feedbacks and/or UL grants) in the subframes of the frame (n+1) are represented by corresponding lines as shown in FIG. 8. The network transfers from the UL/DL configuration 3 to the UL/DL configuration 2 in the frame (n+1) as shown in region 800 of FIG. 8. In this situation, the advanced UEs AUE1 and AUE2 may receive a notification from the network, for transferring from the UL/DL configuration 3 to the UL/DL configuration 2 in the frame (n+1).

Besides, it may happen that the advanced UE AUE1 has performed one or more receptions in the DL subframes 7 and/or 8 of the frame n according to the UL/DL configuration 3, and the advanced UE AUE2 has performed one or more receptions in the DL subframes 1, 5 and/or 6 of the frame n according to the UL/DL configuration 3. If the advanced UE AUE2 intends to perform a triggered transmission corresponding to (e.g., triggered by) the receptions performed in the subframes 1, 5 and/or 6 of the frame n according to the UL/DL configuration 3, no conflict occurs since the subframe 2 of the frame (n+1) is the UL subframe as shown in region 804 of FIG. 8. Accordingly, the advanced UE AUE2 can perform the triggered transmission regularly in the subframe 2 of the frame (n+1). Thus, it causes no problem, if the advanced UE AUE2 performs the transfer of the UL/DL configuration in the frame (n+1) according to the notification. However, the advanced UE AUE1 cannot perform a triggered transmission corresponding to the receptions performed in the subframes 7 and/or 8 of the frame n according to the UL/DL configuration 3, since the subframe 3 of the frame (n+1) is the DL subframe determined according to the UL/DL configuration 2 as shown in region 802 of FIG. 8. In this situation, the advanced UE AUE1 can treat the subframe 3 of the frame (n+1) as the UL subframe according to the present invention, and performs the triggered transmission in the subframe 3 of the frame (n+1). Thus, the advanced UE AUE1 can still perform the transfer of the UL/DL configuration in the frame (n+1) according to the notification, except treating the subframe 3 of the frame (n+1) as the UL subframe. Correspondingly, the network can treat the subframe 3 of the frame (n+1) as the UL subframe according to the present invention, and performs the triggered reception in the subframe 3 of the frame (n+1), to communicate with the advanced UE AUE1 regularly. Thus, the conflict occurred due to the transfer of the UL/DL configuration is solved, and the network and the UEs can operate regularly.

Figure 9:
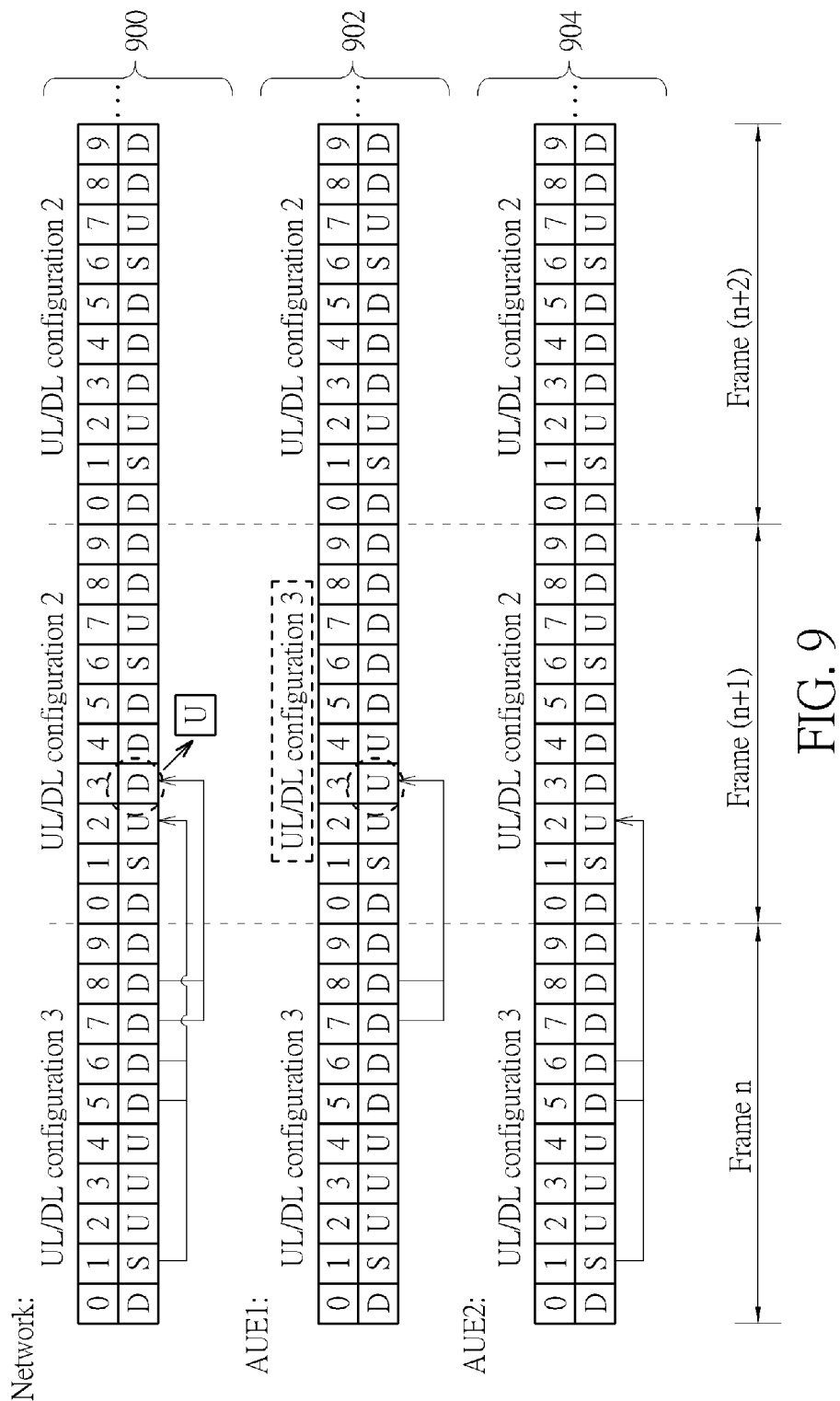

Please refer to FIG. 9, which is a schematic diagram of subframe allocation with transfer of the UL/DL configuration according to an example of the invention, wherein the advanced UE AUE1, the advanced UE AUE2 and the network are considered. The network transfers from the UL/DL configuration 3 to the UL/DL configuration 2 in the frame (n+1) as shown in region 900 of FIG. 9. In this situation, the advanced UEs AUE1 and AUE2 may receive a notification from the network, for transferring from the UL/DL configuration 3 to the UL/DL configuration 2 in the frame (n+1). Besides, it may happen that the advanced UE AUE1 has performed one or more receptions in the DL subframes 7 and/or 8 of the frame n according to the UL/DL configuration 3, and the advanced UE AUE2 has performed one or more receptions in the DL subframes 1, 5 and/or 6 of the frame n according to the UL/DL configuration 3. If the advanced UE AUE2 intends to perform a triggered transmission corresponding to (e.g., triggered by) receptions performed in the subframes 1, 5 and/or 6 of the frame n according to the UL/DL configuration 3, no conflict occurs since the subframe 2 of the frame (n+1) is the UL subframe as shown in region 904 of FIG. 9. Accordingly, the advanced UE AUE2 can perform the triggered transmission regularly in the subframe 2 of the frame (n+1). Further, since no conflict occurs, the advanced UE AUE2 can perform the transfer of the UL/DL configuration in the frame (n+1) according to the notification.

However, the advanced UE AUE1 cannot perform a triggered transmission corresponding to the receptions performed in the subframes 7 and/or 8 of the frame n according to the UL/DL configuration 3, since the subframe 3 of the frame (n+1) is the DL frame determined according to the UL/DL configuration 2 as shown in region 902 of FIG. 9. In this situation, the advanced UE AUE1 can treat the subframe 3 of the frame (n+1) as the UL subframe according to the present invention, and performs the triggered transmission in the subframe 3 of the frame (n+1). Further, since the conflict occurs, the advanced UE AUE1 only configures scheduling timing and HARQ timing according to the UL/DL configuration 2 in the frame (n+1), while keeps the resource definition (i.e., subframe pattern as shown FIG. 1) the same according to the UL/DL configuration 3. After performing the triggered transmission in the frame (n+1), the advanced UE AUE1 adopts the resource definition of the UL/DL configuration 2 in the frame (n+2) to complete the transfer of the UL/DL configuration. Correspondingly, the network can treat the subframe 3 of the frame (n+1) as the UL subframe according to the present invention, and performs the triggered reception in the subframe 3 of the frame (n+1), to communicate with the advanced UE AUE1 regularly. Thus, the conflict occurred due to the transfer of the UL/DL configuration is solved, and the network and the UEs can operate regularly.

Figure 10:
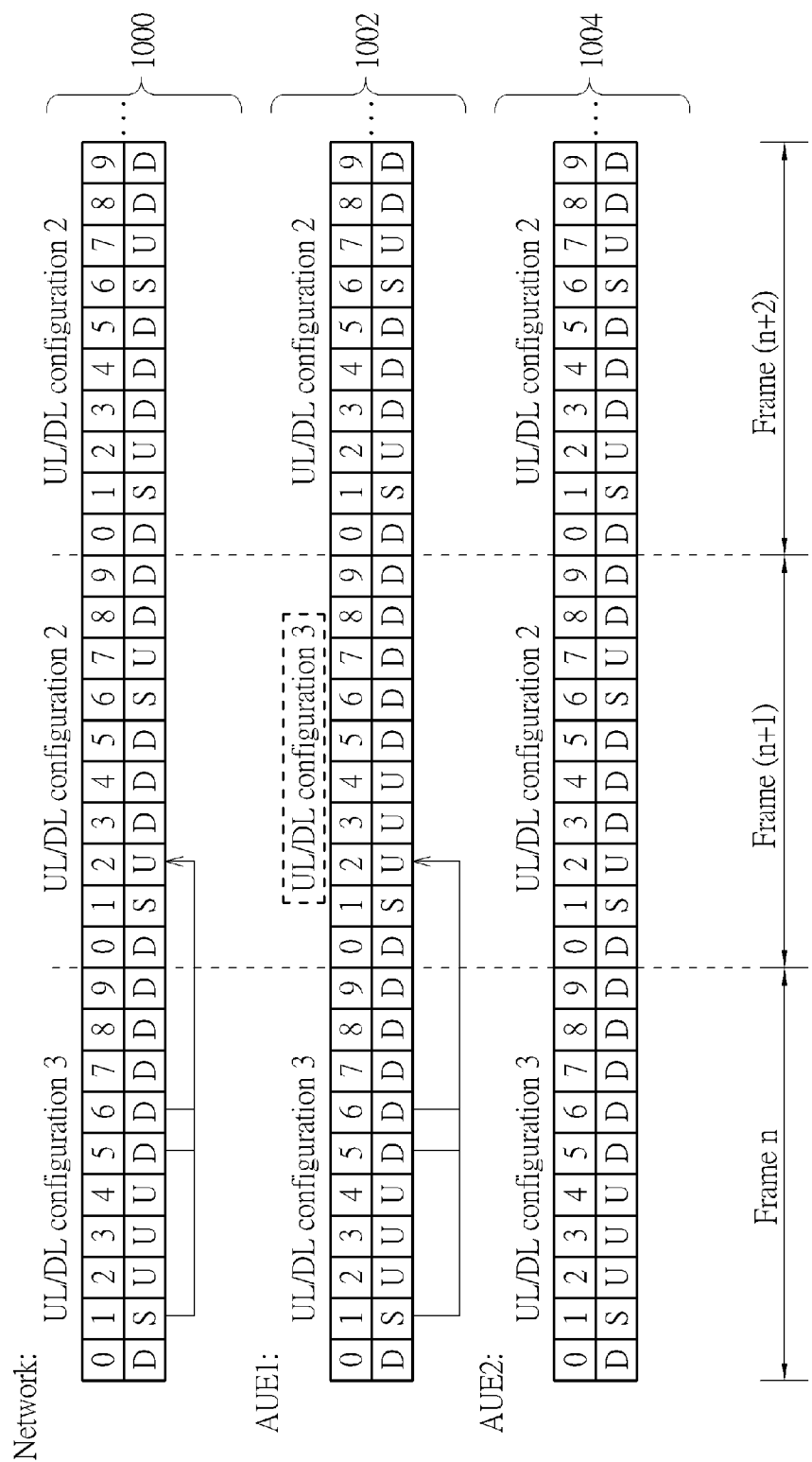

Please refer to FIG. 10, which is a schematic diagram of subframe allocation with transfer of the UL/DL configuration according to an example of the invention, wherein the advanced UE AUE1, the advanced UE AUE2 and the network are considered. The network transfers from the UL/DL configuration 3 to the UL/DL configuration 2 in the frame (n+1) as shown in region 1000 of FIG. 10. In this situation, the advanced UEs AUE1 and AUE2 may receive a notification from the network, for transferring from the UL/DL configuration 3 to the UL/DL configuration 2 in the frame (n+1). Besides, it may happen that the advanced UE AUE1 has performed one or more receptions in the DL subframes 1, 5 and/or 6 of the frame n according to the UL/DL configuration 3, while the advanced UE AUE2 does not perform any reception in the frame n. Since the advanced UE AUE2 expects no triggered transmission, the advanced UE AUE2 can perform the transfer of the UL/DL configuration in the frame (n+1) according to the notification as shown in region 1004 of FIG. 10.

Besides, if the advanced UE AUE1 intends to perform a triggered transmission corresponding to (e.g., triggered by) the receptions performed in the subframes 1, 5 and/or 6 of the frame n according to the UL/DL configuration 3, no conflict occurs since the subframe 2 of the frame (n+1) is the UL subframe as shown in region 1002 of FIG. 10. Accordingly, the advanced UE AUE1 can perform the triggered transmission regularly in the subframe 2 of the frame (n+1). However, even if no conflict occurs, the advanced UE AUE1 can still defer the transfer of the UL/DL configuration as long as there is the triggered transmission. That is, the advanced UE AUE1 only configures scheduling timing and HARQ timing according to the UL/DL configuration 2 in the frame (n+1), while keeps the resource definition (i.e., subframe pattern as shown in FIG. 1) the same according to the UL/DL configuration 3. After performing the triggered transmission in the frame (n+1), the advanced UE AUE1 adopts the resource definition of the UL/DL configuration 2 in the frame (n+2) to complete the transfer of the UL/DL configuration. Thus, the conflict occurred due to the transfer of the UL/DL configuration is solved, and the network and the UEs can operate regularly.

Please note that, configuring the scheduling timing and the HARQ timing according to the UL/DL configuration 2 in the frame (n+1) means that if the advanced UE AUE1 performs a transmission or reception (e.g., new transmission or reception) in a subframe of the frame (n+1), a triggered transmission or reception will be performed in a subframe of the frame (n+1) or a next frame according to the UL/DL configuration 2. Besides, although only the triggered transmission corresponding one or more receptions in the previous frame is considered in FIGS. 8-10, those skilled in the art can readily make modifications or alterations accordingly, to apply the present invention to the cases of one or more triggered receptions corresponding one or more transmissions in the previous frame.

Figure 11:
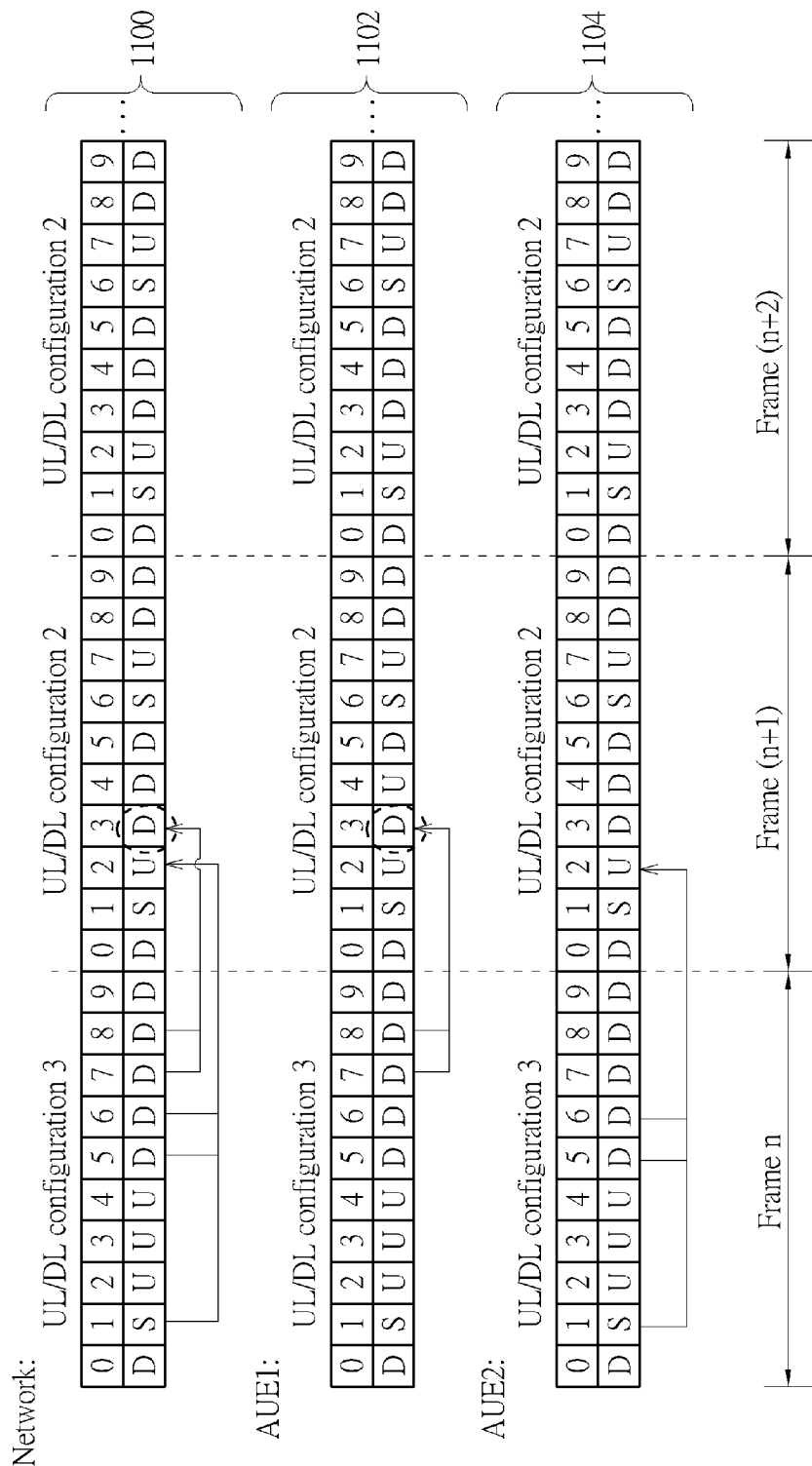

Please refer to FIG. 11, which is a schematic diagram of subframe allocation with transfer of the UL/DL configuration according to an example of the invention, wherein the advanced UE AUE1, the advanced UE AUE2 and the network are considered. The network transfers from the UL/DL configuration 3 to the UL/DL configuration 2 in the frame (n+1) as shown in region 1100 of FIG. 11. In this situation, the advanced UEs AUE1 and AUE2 may receive a notification from the network, for transferring from the UL/DL configuration 3 to the UL/DL configuration 2 in the frame (n+1). Besides, it may happen that the advanced UE AUE1 has performed one or more receptions in the DL subframes 7 and/or 8 of the frame n according to the UL/DL configuration 3, and the advanced UE AUE2 has performed one or more receptions in the DL subframes 1, 5 and/or 6 of the frame n according to the UL/DL configuration 3. If the advanced UE AUE2 intends to perform a triggered transmission corresponding to (e.g., triggered by) the receptions performed in the subframes 1, 5 and/or 6 of the frame n according to the UL/DL configuration 3, no conflict occurs since the subframe 2 of the frame (n+1) is the UL subframe as shown in region 1104 of FIG. 11. Accordingly, the advanced UE AUE2 can perform the triggered transmission regularly in the subframe 2 of the frame (n+1). Thus, it causes no problem, if the advanced UE AUE2 performs the transfer of the UL/DL configuration in the frame (n+1) according to the notification.

However, the advanced UE AUE1 cannot perform a triggered transmission corresponding to the receptions performed in the subframes 7 and/or 8 of the frame n according to the UL/DL configuration 3, since the subframe 3 of the frame (n+1) is the DL subframe determined according to the UL/DL configuration 2 as shown in region 1102 of FIG. 11. In this situation, the advanced UE AUE1 simply drops the triggered transmission according to the present invention. Correspondingly, the network can treat the triggered transmission dropped by the advanced UE AUE1 as an ACK if it is a HARQ feedback, according to the present invention. Thus, the conflict occurred due to the transfer of the UL/DL configuration is solved, and the network and the UEs can operate regularly.

Figure 12:
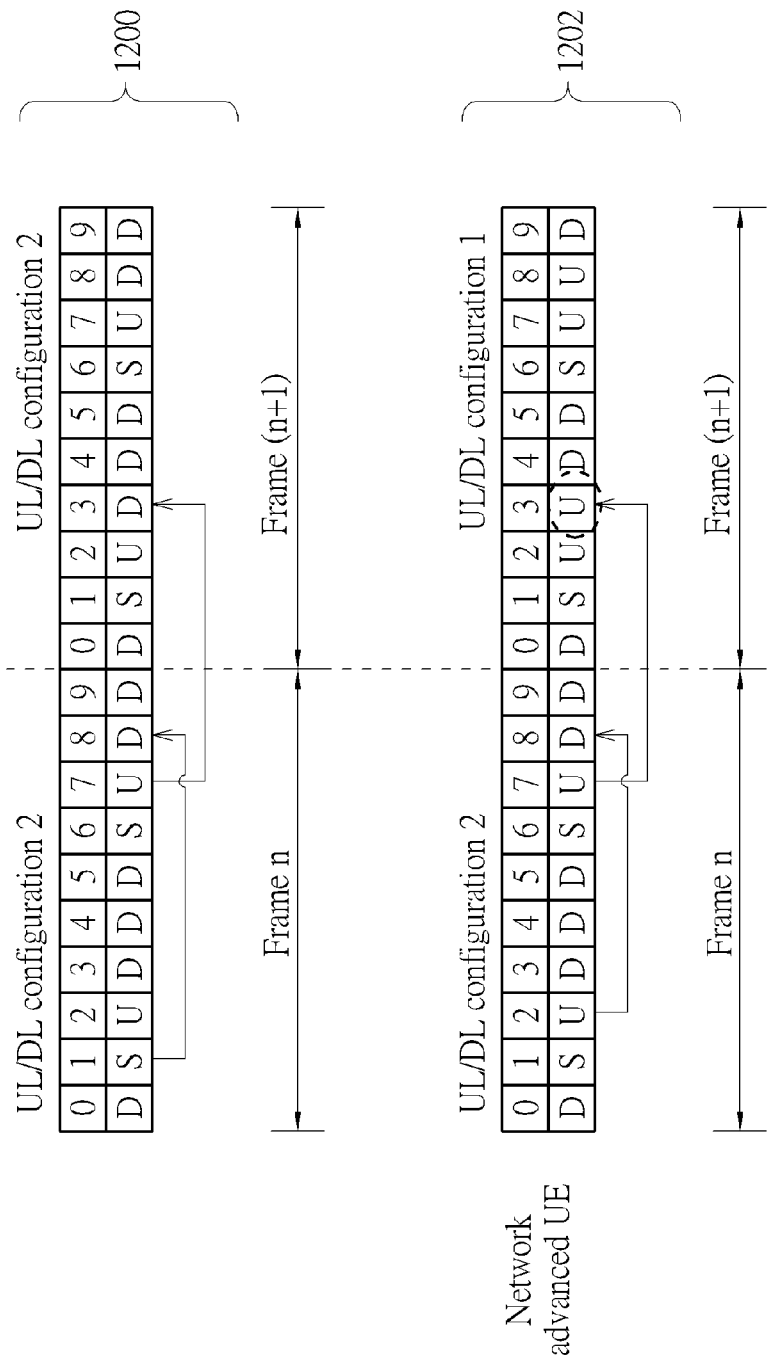

Please refer to FIG. 12, which is a schematic diagram of subframe allocation with transfer of the UL/DL configuration according to an example of the invention, wherein the advanced UE and the network are considered. Rules for performing triggered receptions (receiving e.g., HARQ feedbacks and/or UL grants) according to the UL/DL configuration 2 in the subframes of the frames n and (n+1) are represented by corresponding lines as shown in region 1200 of FIG. 12. The network transfers from the UL/DL configuration 2 to the UL/DL configuration 1 in the frame (n+1) as shown in region 1202 of FIG. 12. In this situation, the advanced UE may receive a notification from the network, for transferring from the UL/DL configuration 2 to the UL/DL configuration 1 in the frame (n+1). Besides, it may happen that the advanced UE has performed one or more transmissions in the DL subframes 7 and/or 8 of the frame n according to the UL/DL configuration 2. However, the advanced UE cannot perform a triggered reception corresponding to the transmission performed in the subframe 7 of the frame n according to the UL/DL configuration 2, since the subframe 3 of the frame (n+1) is the UL frame determined according to the UL/DL configuration 1 as shown in region 1202 of FIG. 12. In this situation, the network simply drops the triggered transmission (which is the triggered reception for the advanced UE) according to the present invention. Correspondingly, the advanced UE will not try to perform the triggered reception according to the present invention, and treats the triggered reception dropped by the network as an ACK if it is a HARQ feedback. Thus, the conflict occurred due to the transfer of the UL/DL configuration is solved, and the network and the UEs can operate regularly.

Please note that, the triggered reception for the advanced UE may include a PDSCH and/or a PHICH, and the triggered transmission for the advanced UE may include a PUSCH and/or a PDCCH, and is not limited.

Figure 13:
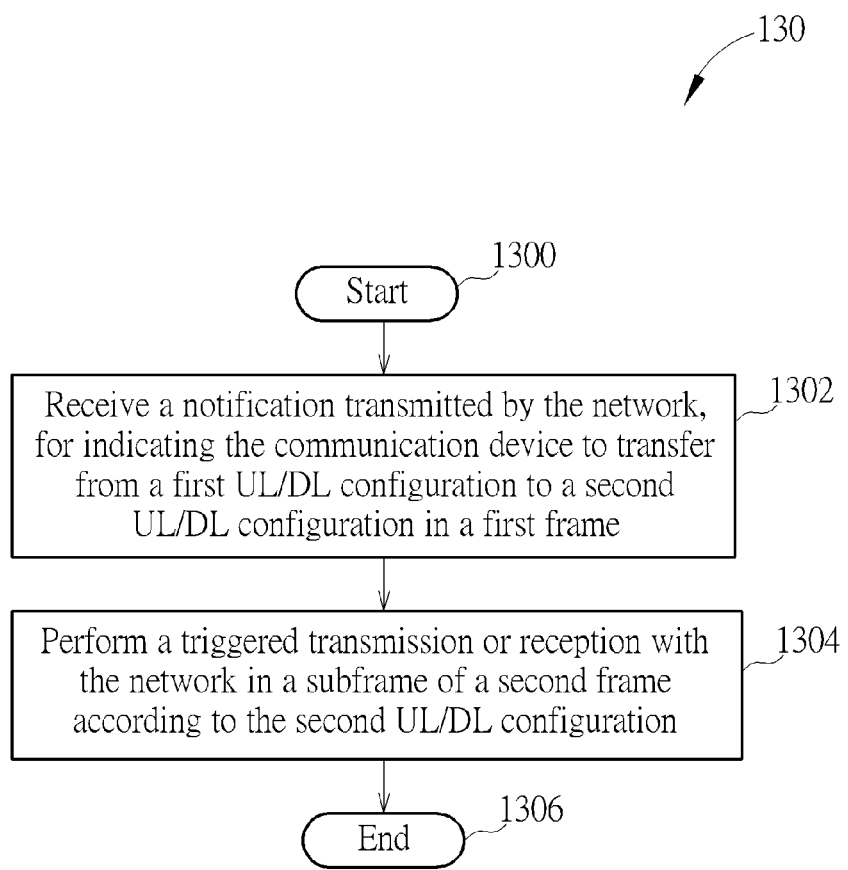
FIG. 13 is a flowchart of a process according to an example of the present invention.

Please refer to FIG. 13, which is a flowchart of a process 130 according to an example of the present invention. The process 130 is utilized in the advanced UE shown in FIG. 2, for handling resource allocation in the TDD mode. The process 130 may be compiled into the program code 314 and includes the following steps:

Step 1300: Start.

Step 1302: Receive a notification transmitted by the network, for indicating the communication device to transfer from a first UL/DL configuration to a second UL/DL configuration in a first frame.

Step 1304: Perform a triggered transmission or reception with the network in a subframe of a second frame according to the second UL/DL configuration.

Step 1306: End.

According to the process 130, after the advanced UE receives a notification transmitted by the network, for indicating the communication device to transfer from a first UL/DL configuration to a second UL/DL configuration in a first frame, the advanced UE performs a triggered transmission or reception (if any) with the network in a subframe of a second frame according to the second UL/DL configuration. That is, the advanced UE performs the transfer of the UL/DL configuration according to the notification, and performs the triggered transmission or reception according to the second UL/DL configuration. The triggered transmission or reception may include a HARQ feedback and/or a UL grant triggered by at least one previous transmission or reception performed in at least one previous subframe of at least one previous frame according to the first UL/DL configuration. Thus, the advanced UE will not lose the triggered transmission or reception during the transfer of the UL/DL configuration, and can still operate regularly.

Please note that, realization of the process 130 is not limited. For example, the first frame and the second frame can be the same frame or different frames. That is, the advanced UE may transfer from the first UL/DL configuration to the second UL/DL configuration in the first frame, i.e., perform the transfer according to the notification. Besides, the advanced UE can perform one or more new transmissions or receptions according to the second UL/DL configuration (i.e., real configuration) in the subframe where the triggered transmission or reception is performed, if no conflict occurs. Further, the advanced UE may also perform one or more new transmissions or receptions according to the second UL/DL configuration (i.e., real configuration) in the subframes where no triggered transmission or reception is to be performed. On the other hand, when performing step 1304, the advanced UE can perform a first part of the triggered transmission or reception with the network in the subframe of the second frame according to the second UL/DL configuration, when a first set of the at least one previous subframe is mapped by the subframe according to the second UL/DL configuration, wherein the first part of the triggered transmission or reception is triggered by a first set of the at least one previous transmission or reception performed on the first set of the at least one previous subframe. Besides, the advanced UE can drop a second part of the triggered transmission or reception, when a second set of the at least one previous subframe is not mapped by the subframe according to the second UL/DL configuration, wherein the second part of the triggered transmission or reception is triggered by a second set of the at least one previous transmission or reception performed on the second set of the at least one previous subframe.

Figure 14:
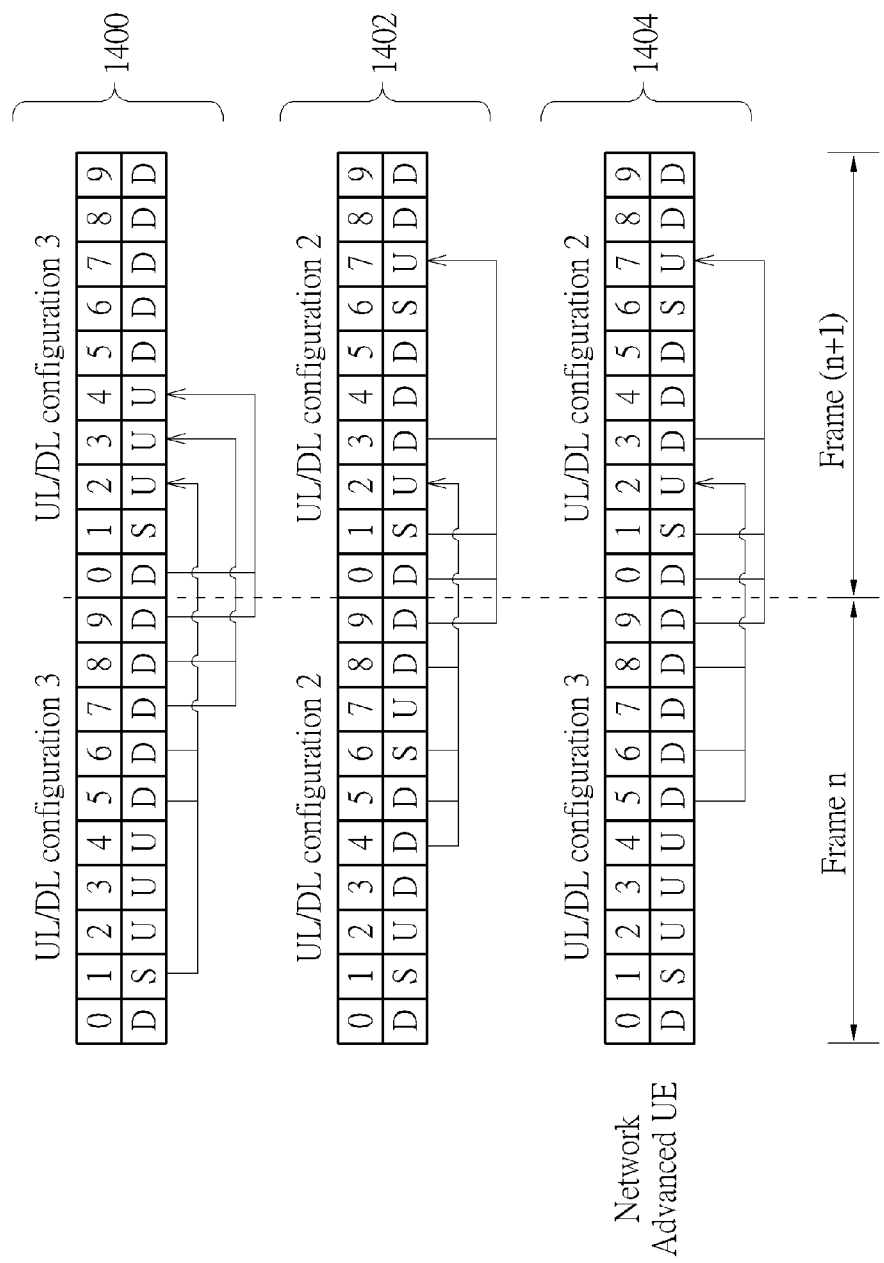
FIGS. 14-15 are schematic diagrams of subframe allocation with transfer of the UL/DL configuration according to an example of the invention.

Please refer to FIG. 14, which is a schematic diagram of subframe allocation with transfer of the UL/DL configuration according to an example of the invention, wherein the advanced UE and the network are considered. Rules for performing triggered transmissions (e.g., transmitting HARQ feedbacks and/or UL grants) in the subframes of the frame (n+1) are represented by corresponding lines as shown in FIG. 14, wherein the rules of the UL/DL configurations 3 and 2 are shown in regions 1400 and 1402 of FIG. 14, respectively. The network transfers from the UL/DL configuration 3 to the UL/DL configuration 2 in the frame (n+1) as shown in region 1404 of FIG. 14. In this situation, the advanced UE may receive a notification from the network, for transferring from the UL/DL configuration 3 to the UL/DL configuration 2 in the frame (n+1). Besides, it may happen that the advanced UE has performed one or more receptions in the DL subframes 1, 5, 6, 7, 8 and/or 9 of the frame n according to the UL/DL configuration 3. However, the advanced UE cannot perform a triggered transmission corresponding to receptions performed in the subframes 7, 8 and/or 9 of the frame n according to the UL/DL configuration 3, since the subframes 3-4 of the frame (n+1) are the DL frames determined according to the UL/DL configuration 2 as shown in region 1402 of FIG. 14. In this situation, the advanced UE can perform a first triggered transmission in the subframe 2 of the frame (n+1) according to the UL/DL configuration 2, since the subframes 5-6 and 8 of the frame n are mapped by the subframe 2 of the frame (n+1) according to the UL/DL configuration 2, wherein the first triggered transmission is triggered by the receptions performed on the subframes 5, 6 and/or 8 of the frame n.

Besides, the advanced UE can perform a second triggered transmission in the subframe 7 of the frame (n+1) according to the UL/DL configuration 2, since the subframe 9 of the frame n is mapped by the subframe 7 of the frame (n+1) according to the UL/DL configuration 2, wherein the second triggered transmission is triggered by the reception performed on the subframe 9 of the frame n. The triggered transmission corresponding to the receptions performed in the subframes 1 and/or 7 of the frame n are dropped, since these subframes cannot be mapped by a UL frame of the frame (n+1) according to according to the UL/DL configuration 2. Thus, the advanced UE can still perform the transfer of the UL/DL configuration in the frame (n+1) according to the notification, while part of the triggered transmission is given up. Correspondingly, the network can treat the triggered transmission dropped by the advanced UE as an ACK if it is a HARQ feedback, according to the present invention. Thus, the conflict occurred due to the transfer of the UL/DL configuration is solved, and the network and the UEs can operate regularly.

Figure 15:
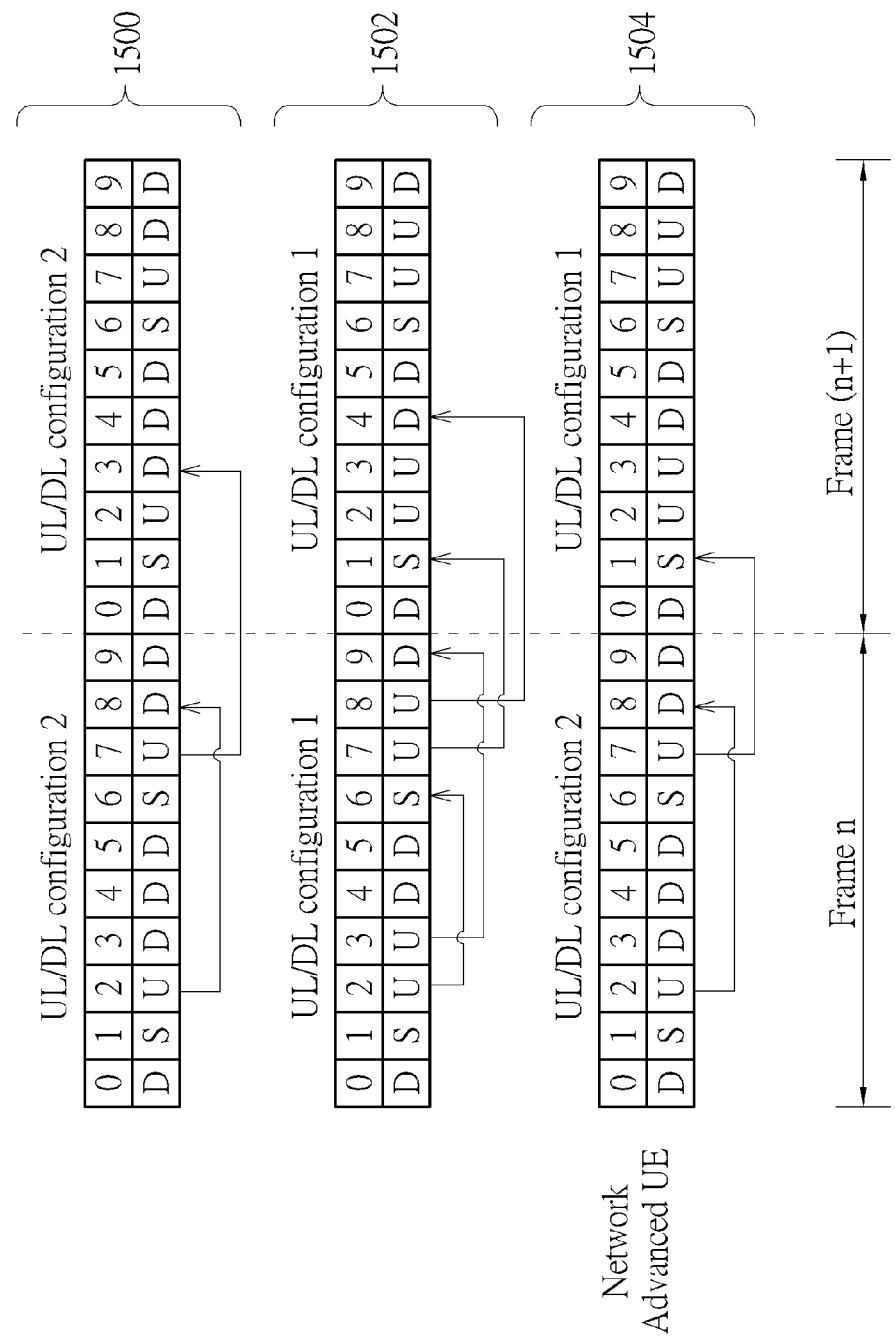

Please refer to FIG. 15, which is a schematic diagram of subframe allocation with transfer of the UL/DL configuration according to an example of the invention, wherein the advanced UE and the network are considered. Rules for performing triggered receptions (e.g., receiving HARQ feedbacks and/or UL grants) in the subframes of the frames n and (n+1) are represented by corresponding lines as shown in FIG. 15, wherein the rules of the UL/DL configurations 2 and 1 are shown in regions 1500 and 1502 of FIG. 15, respectively. The network transfers from the UL/DL configuration 2 to the UL/DL configuration 1 in the frame (n+1) as shown in region 1504 of FIG. 15. In this situation, the advanced UE may receive a notification from the network, for transferring from the UL/DL configuration 2 to the UL/DL configuration 1 in the frame (n+1). Besides, it may happen that the advanced UE has performed one or more transmissions in the UL subframes 2 and/or 7 of the frame n according to the UL/DL configuration 2. In this situation, the advanced UE can perform a triggered reception in the subframe 1 of the frame (n+1) according to the UL/DL configuration 1, since the subframe 7 of the frame n is mapped by the subframe 1 of the frame (n+1) according to the UL/DL configuration 1, wherein the triggered reception is triggered by the transmission performed in the subframe 7 of the frame n. Thus, the advanced UE can still perform the transfer of the UL/DL configuration in the frame (n+1) according to the notification, while no triggered transmission is given up in the present example. However, if a previous transmission is performed in a subframe of the frame n which is not mapped by a subframe of the frame (n+1) according to the UL/DL configuration 1, the network drops a triggered transmission (which is the triggered reception for the advanced UE). Correspondingly, the advanced UE will not try to perform the triggered reception corresponding to the previous transmission according to the present invention, and treats the triggered reception dropped by the network as an ACK if it is a HARQ feedback. Thus, the conflict occurred due to the transfer of the UL/DL configuration is solved, and the network and the UEs can operate regularly.

Figure 16:
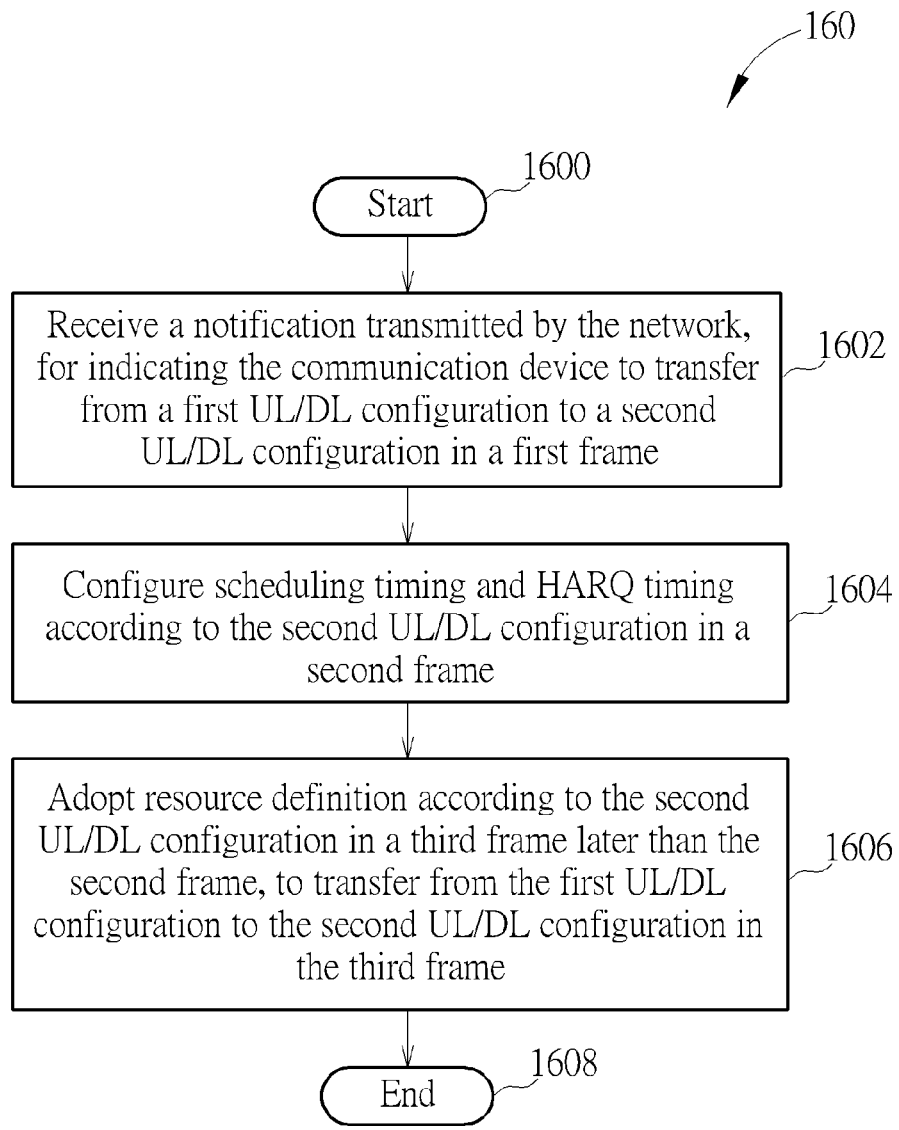
FIG. 16 is a flowchart of a process according to an example of the present invention.

Please refer to FIG. 16, which is a flowchart of a process 160 according to an example of the present invention. The process 160 is utilized in the advanced UE shown in FIG. 2, for handling resource allocation in the TDD mode. The process 160 may be compiled into the program code 314 and includes the following steps:

Step 1600: Start.

Step 1602: Receive a notification transmitted by the network, for indicating the communication device to transfer from a first UL/DL configuration to a second UL/DL configuration in a first frame.

Step 1604: Configure scheduling timing and HARQ timing according to the second UL/DL configuration in a second frame.

Step 1606: Adopt resource definition according to the second UL/DL configuration in a third frame later than the second frame, to transfer from the first UL/DL configuration to the second UL/DL configuration in the third frame.

Step 1608: End.

According to the process 160, after the advanced UE receives a notification transmitted by the network, for indicating the communication device to transfer from a first UL/DL configuration to a second UL/DL configuration in a first frame, the advanced UE configures scheduling timing and HARQ timing according to the second UL/DL configuration in a second frame. Then, the advanced UE adopts resource definition according to the second UL/DL configuration in a third frame later than the second frame, to transfer from the first UL/DL configuration to the second UL/DL configuration in the second frame. In other words, whether there is a conflict between the first UL/DL configuration and the second UL/DL configuration or not, the advanced UE defers the transfer of the UL/DL configuration. Thus, the advanced UE can perform a triggered transmission or reception (if any) according to the first UL/DL configuration in a subframe of the second frame without losing the triggered transmission or reception during the transfer of the UL/DL configuration. Note that the triggered transmission or reception may include a HARQ feedback and/or a UL grant triggered by at least one previous transmission or reception performed in at least one previous subframe of at least one previous frame according to the first UL/DL configuration.

Please note that, realization of the process 160 is not limited. For example, the first frame and the second frame can be the same frame or different frames. For example, the advanced UE can perform one or more new transmissions or receptions according to the second UL/DL configuration (i.e., real configuration) in the subframe where the triggered transmission or reception is performed, if no conflict occurs. Further, the advanced UE may also perform one or more new transmissions or receptions according to the second UL/DL configuration (i.e., real configuration) in the subframes where no triggered transmission or reception is to be performed.

Figure 17:
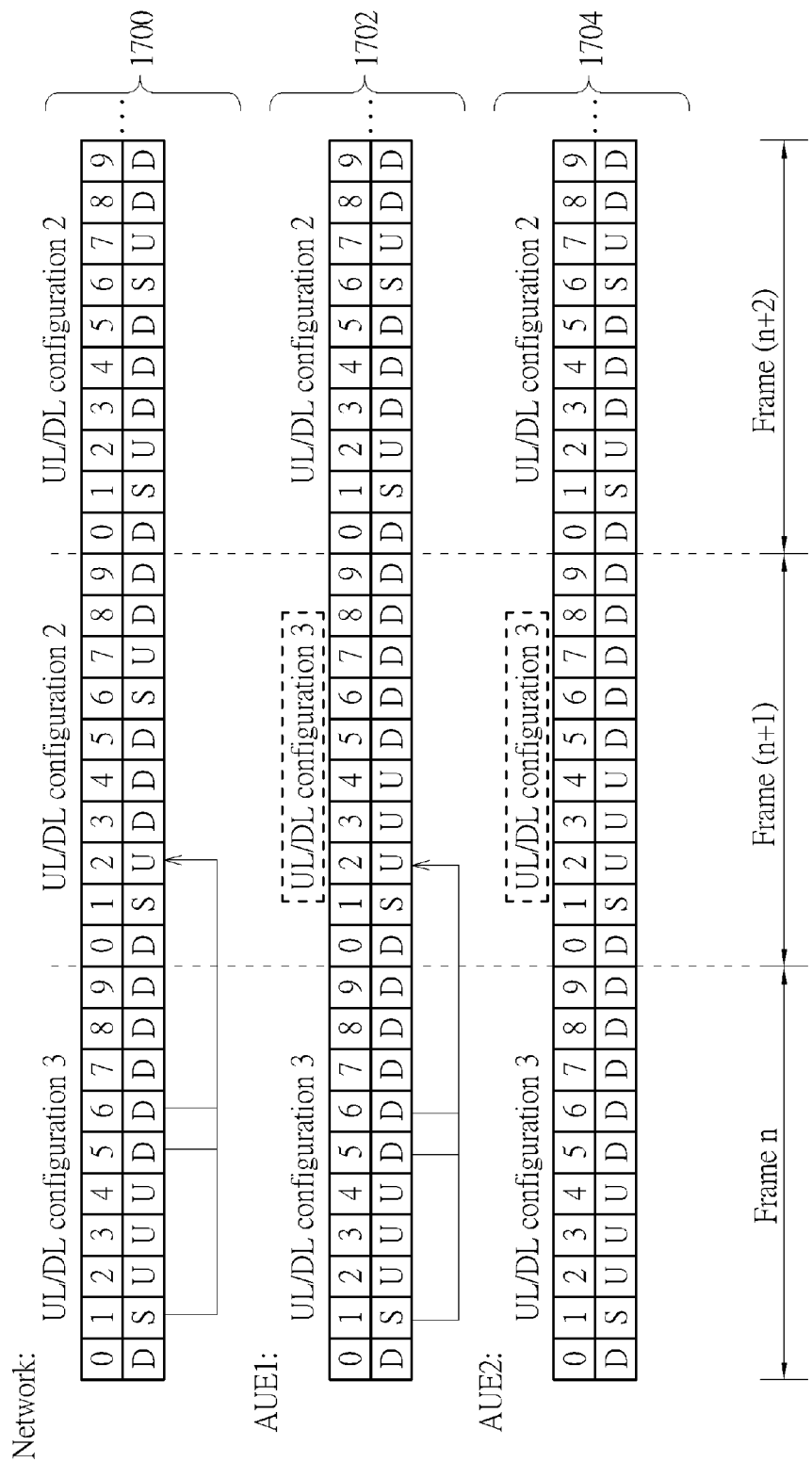
FIG. 17 is a schematic diagram of subframe allocation with transfer of the UL/DL configuration according to an example of the invention.

Please refer to FIG. 17, which is a schematic diagram of subframe allocation with transfer of the UL/DL configuration according to an example of the invention, wherein the advanced UE AUE1, the advanced UE AUE2 and the network are considered. The network intends to transfer from the UL/DL configuration 3 to the UL/DL configuration 2 in the frame (n+1) as shown in region 1700 of FIG. 17. In this situation, the advanced UEs AUE1 and AUE2 may receive a notification from the network, for transferring from the UL/DL configuration 3 to the UL/DL configuration 2 in the frame (n+1). Besides, it may happen that the advanced UE AUE1 has performed one or more receptions in the DL subframes 1, 5 and/or 6 of the frame n according to the UL/DL configuration 3, while the advanced UE AUE2 does not perform any reception in the frame n. The advanced UE AUE1 only configures scheduling timing according to the UL/DL configuration 2, and keeps resource definition (i.e., subframe pattern as shown in FIG. 1) in the frame (n+1) the same according to the UL/DL configuration 3 as shown in region 1702 of FIG. 17. If the advanced UE AUE1 intends to perform a triggered transmission corresponding to (e.g., triggered by) the receptions performed in the subframes 1, 5 and/or 6 of the frame n according to the UL/DL configuration 3, no conflict occurs and the advanced UE AUE1 can perform the triggered transmission in the subframe 2 of the frame (n+1) according to the UL/DL configuration 3. After performing the triggered transmission in the frame (n+1), the advanced UE AUE1 adopts the resource definition according to the UL/DL configuration 2 in the frame (n+2) to complete the transfer of the UL/DL configuration. Similarly, the advanced UE AUE2 only configures scheduling timing according to the UL/DL configuration 2, and keeps resource definition (i.e., subframe pattern as shown in FIG. 1) in the frame (n+1) the same according to the UL/DL configuration 3 as shown in region 1704 of FIG. 17. Then, the advanced UE AUE2 adopts the resource definition according to the UL/DL configuration 2 in the frame (n+2) to complete the transfer of the UL/DL configuration. Thus, the conflict occurred due to the transfer of the UL/DL configuration is solved, and the network and the UEs can operate regularly.

Please note that, configuring the scheduling timing and the HARQ timing according to the UL/DL configuration 2 in the frame (n+1) means that if the advanced UE AUE1 performs a transmission or reception (e.g., new transmission or reception) in a subframe of the frame (n+1), a triggered transmission or reception will be performed in a subframe of the frame (n+1) or a next frame according to the UL/DL configuration 2. Besides, although only the triggered transmission corresponding one or more receptions in the previous frame is considered in FIG. 17, those skilled in the art can readily make modifications or alterations accordingly, to apply the present invention to the cases of one or more triggered receptions corresponding one or more transmissions in the previous frame.

Those skilled in the art should readily make combinations, modifications and/or alterations on the abovementioned description and examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 30.

To sum up, the present invention provides a method for handling resource allocation in the TDD mode. Since the conflict occurred due to different UL/DL configurations of the advanced UE, the legacy UE and the network or the transfer of the UL/DL configuration is solved, the advance UE can change its UL/DL configuration fast according to fast varying traffic characteristics and environments while the legacy UE can still operate regularly. Thus, performance of the wireless communication system can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling resource allocation for a network of a wireless communication system, the method comprising:

performing at least one first transmission or reception according to a first uplink (UL)/downlink (DL) configuration with a communication device of the wireless communication system;

transferring from the first UL/DL configuration to a second UL/DL configuration in a first frame; and performing a second transmission or reception triggered by the at least one first transmission or reception with the communication device of the wireless communication system in a subframe of the first frame or a second frame according to the first UL/DL configuration, when a direction of the subframe determined according to the first UL/DL configuration and a direction of the subframe determined according to the second UL/DL configuration are different.

2. The method of claim 1, wherein the second transmission or reception comprises at least one of a hybrid automatic repeat request (HARD) feedback and a UL grant triggered by the at least one first transmission or reception performed in at least one previous subframe of at least one previous frame according to the first UL/DL configuration.

3. The method of claim 1, wherein the network performs the second transmission or reception with the communication device in the subframe of the first frame or the second frame according to the first UL/DL configuration, when a direction of the subframe determined according to the first UL/DL configuration is UL.

4. The method of claim 1, further comprising:
performing a new transmission or reception with the communication device in the subframe of the first frame or the second frame according to the second UL/DL configuration.

5. A method of handling resource allocation for a communication device of a wireless communication system, the method comprising:
performing at least one first transmission or reception according to a first uplink (UL)/downlink (DL) configuration with a network of the wireless communication system;
receiving a notification transmitted by the network of the wireless communication system, for indicating the communication device to transfer from the first UL/DL configuration to a second UL/DL configuration in a first frame;
performing a second transmission or reception triggered by the at least one first transmission or reception with the network in a subframe of the first frame or a second frame according to the first UL/DL configuration, when a direction of the subframe determined according to the first UL/DL configuration and a direction of the subframe determined according to the second UL/DL configuration are the same; and
dropping the second transmission or reception, when the direction of the subframe determined according to the first UL/DL configuration and the direction of the subframe determined according to the second UL/DL configuration are different.

6. The method of claim 5, wherein the second transmission or reception comprises at least one of a hybrid automatic repeat request (HARQ) feedback and a UL grant triggered by the at least one first transmission or reception performed in at least one previous subframe of at least one previous frame according to the first UL/DL configuration.

7. The method of claim 5, wherein the step of performing the second transmission with the network in the subframe of the first frame or the second frame according to the first UL/DL configuration, when the direction of the subframe determined according to the first UL/DL configuration and the direction of the subframe determined according to the second UL/DL configuration are the same comprises:
performing the second transmission with the network in the subframe of the first frame or the second frame according to the first UL/DL configuration, when the direction of the subframe determined according to the second UL/DL configuration is an UL subframe.

8. The method of claim 5, wherein the step of dropping the second transmission, when the direction of the subframe determined according to the first UL/DL configuration and the direction of the subframe determined according to the second UL/DL configuration are different comprises:
dropping the second transmission, when the direction of the subframe determined according to the second UL/DL configuration is not an UL subframe.

9. A method of handling resource allocation for a communication device of a wireless communication system, the method comprising:
performing at least one first transmission or reception according to a first uplink (UL)/downlink (DL) configuration with a network of the wireless communication system;
receiving a notification transmitted by the network of the wireless communication system, for indicating the communication device to transfer from the first UL/DL configuration to a second UL/DL configuration in a first frame; and
performing a first part of a second transmission or reception triggered by the at least one first transmission or reception with the network in a subframe of the first frame or a second frame according to the second UL/DL configuration, when a first set of at least one previous subframe is mapped by the subframe according to the second UL/DL configuration, wherein the first part of the second transmission or reception is triggered by a first set of the at least one first transmission or reception performed on the first set of the at least one previous subframe.

10. The method of claim 9, wherein the second transmission or reception comprises at least one of a hybrid automatic repeat request (HARQ) feedback and a UL grant triggered by the at least one first transmission or reception performed in the at least one previous subframe of at least one previous frame according to the first UL/DL configuration.

11. The method of claim 9, further comprising:
stopping performing a second part of the second transmission or reception, when a second set of the at least one previous subframe is not mapped by the subframe according to the second UL/DL configuration, wherein the second part of the second transmission or reception is triggered by a second set of the at least one first transmission or reception performed on the second set of the at least one previous subframe.

12. The method of claim 9, further comprising:
performing a new transmission or reception with the network in the subframe of the first frame or the second frame according to the second UL/DL configuration.

13. A communication device of handling resource allocation, comprising:
a storage unit, for storing instructions of:
performing at least one first transmission or reception according to a first uplink (UL)/downlink (DL) configuration with a network of the wireless communication system;
receiving a notification transmitted by the network of the wireless communication system, for indicating the communication device to transfer from the first UL/DL configuration to a second UL/DL configuration in a first frame;
performing a second transmission or reception triggered by the at least one first transmission or reception with the network in a subframe of the first frame or a second frame according to the first UL/DL configuration, when a direction of the subframe determined according to the first UL/DL configuration and a direction of the subframe determined according to the second UL/DL configuration are the same; and
dropping the second transmission or reception, when the direction of the subframe determined according to the first UL/DL configuration and the direction of the subframe determined according to the second UL/DL configuration are different; and a processing means, coupled to the storage unit, configured to execute the instructions stored in the storage unit.

14. The communication device of claim 13, wherein the second transmission or reception comprises at least one of a hybrid automatic repeat request (HARD) feedback and a UL grant triggered by the at least one first transmission or reception performed in at least one previous subframe of at least one previous frame according to the first UL/DL configuration.

15. The communication device of claim 13, wherein the instruction of performing the second transmission with the network in the subframe of the first frame or the second frame according to the first UL/DL configuration, when the direction of the subframe determined according to the first UL/DL configuration and the direction of the subframe determined according to the second UL/DL configuration are the same comprises:

performing the second transmission with the network in the subframe of the first frame or the second frame according to the first UL/DL configuration, when the direction of the subframe determined according to the second UL/DL configuration is an UL subframe.

16. The communication device of claim 13, wherein the instruction of dropping the second transmission, when the direction of the subframe determined according to the first UL/DL configuration and the direction of the subframe determined according to the second UL/DL configuration are different comprises:

dropping the second transmission, when the direction of the subframe determined according to the second UL/DL configuration is not an UL subframe.

17. A communication device of handling resource allocation, comprising:

a storage unit, for storing instructions of:

performing at least one first transmission or reception according to a first uplink (UL)/downlink (DL) configuration with a network of the wireless communication system;

receiving a notification transmitted by the network of the wireless communication system, for indicating the communication device to transfer from the first UL/DL configuration to a second UL/DL configuration in a first frame; and performing a first part of a second transmission or reception triggered by the at least one first transmission or reception with the network in a subframe of the first frame or a second frame according to the second UL/DL configuration, when a first set of at least one previous subframe is mapped by the subframe according to the second UL/DL configuration, wherein the first part of the second transmission or reception is triggered by a first set of the at least one first transmission or reception performed on the first set of the at least one previous subframe; and a processing means, coupled to the storage unit, configured to execute the instructions stored in the storage unit.

18. The communication device of claim 17, wherein the second transmission or reception comprises at least one of a hybrid automatic repeat request (HARD) feedback and a UL grant triggered by the at least one first transmission or reception performed in the at least one previous subframe of at least one previous frame according to the first UL/DL configuration.

19. The communication device of claim 17, wherein the storage unit further stores the instruction of:

stopping performing a second part of the second transmission or reception, when a second set of the at least one previous subframe is not mapped by the subframe according to the second UL/DL configuration, wherein the second part of the second transmission or reception is triggered by a second set of the at least one first transmission or reception performed on the second set of the at least one previous subframe.

20. The communication device of claim 17, the storage unit further stores the instruction of:

performing a new transmission or reception with the network in the subframe of the first frame or the second frame according to the second UL/DL configuration.

* * * * *